(No Model.)  2 Sheets—Sheet 1.

P. THORPE.
MACHINE FOR MIXING FLOUR AND OTHER SUBSTANCES.

No. 276,646.  Patented May 1, 1883.

(No Model.) 2 Sheets—Sheet 2.

P. THORPE.
MACHINE FOR MIXING FLOUR AND OTHER SUBSTANCES.

No. 276,646. Patented May 1, 1883.

WITNESSES:
Jas. F. Duhamel.
Walter S. Dodge.

INVENTOR:
Philip Thorpe,
by Dodge & Son,
Attys.

UNITED STATES PATENT OFFICE.

PHILIP THORPE, OF NEW YORK, N. Y.

MACHINE FOR MIXING FLOUR AND OTHER SUBSTANCES.

SPECIFICATION forming part of Letters Patent No. 276,646, dated May 1, 1883.

Application filed December 26, 1882. (No model.)

*To all whom it may concern:*

Be it known that I, PHILIP THORPE, of New York city, in the county of New York and State of New York, have invented certain Improvements in Machines for Mixing Flour and other Substances, of which the following is a specification.

My invention relates to a machine more especially intended for mixing, rubbing, and working together the ingredients of a prepared flour which I manufacture or put up for sale, but which machine is also adapted for other uses.

The invention consists in various features and details hereinafter fully explained, both with regard to the machine and the method of treating the ingredients to secure their proper mingling and incorporation.

Figure 1:
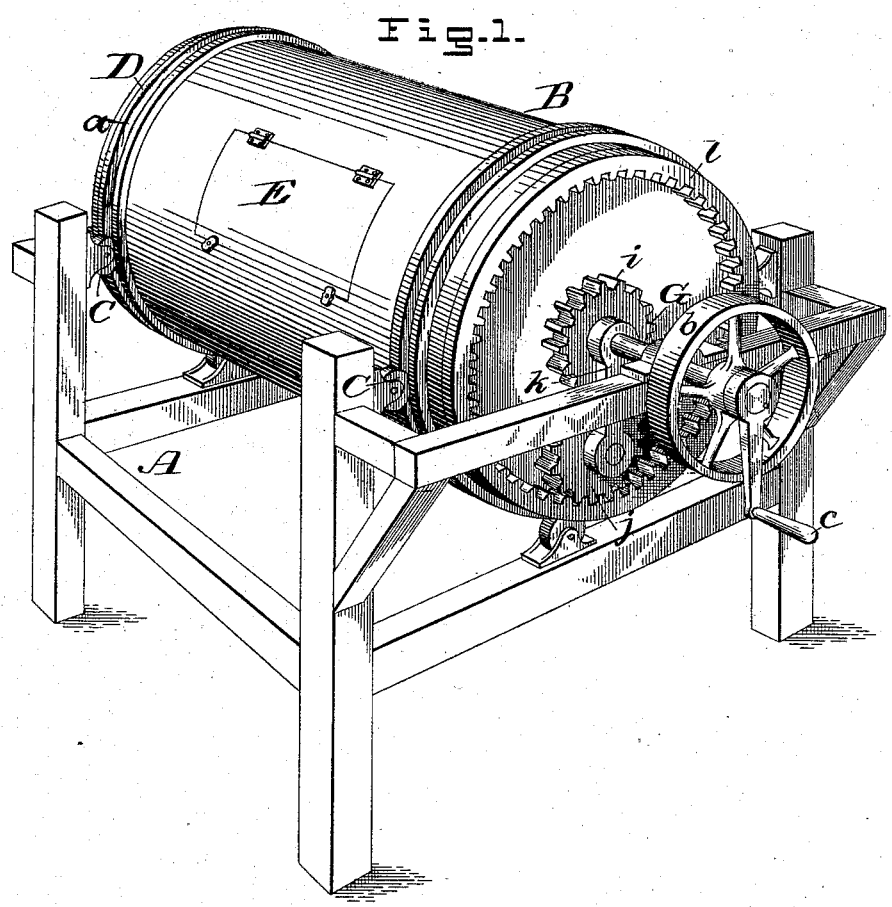
Figure 2:
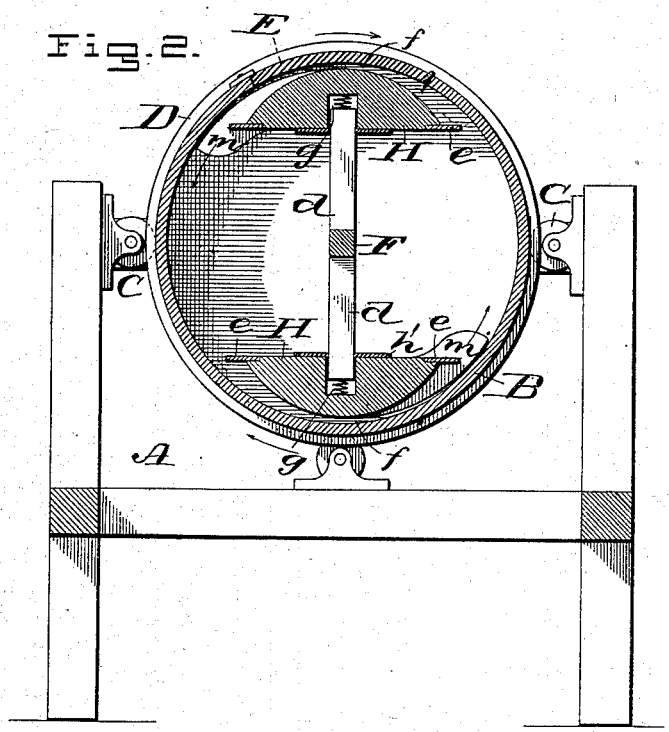

In the accompanying drawings, Figure 1 represents a perspective view of my improved machine; Fig. 2, a vertical transverse section through the same, and Fig. 3 a perspective view of the central shaft and rubbers.

The flour preparation to which I have above referred consists of flour, baking-powder, and butter, lard, or other fatty matter, in suitable proportions; and the purpose of the machine is to so mix, mingle, and combine the ingredients that the finished product shall present essentially the same appearance as common flour, while every particle of the mass shall consist of a mixture of the three elements in their stated or predetermined relative proportions. To accomplish this result it is found necessary not only to thoroughly stir and mix the ingredients together, but also to subject them to a pressing and rubbing action, by which the flour particles are made to take up or become impregnated with the fatty matter and united with the baking-powder, and when thus treated the product is found to be of uniform quality and texture throughout, and consequently sure to produce always the same results in use. To secure this combined action of mixing, pressing, and rubbing, and to perform the operation speedily, economically, and efficiently, I construct my machine in the following manner, subject of course to such modifications of detail as fall rather within the province of the machinist or mechanic than that of the inventor.

A represents a stout frame, of wood or other suitable material, within which is mounted a horizontal rotary cylinder, B, preferably carried by anti-friction rollers C, running in grooved bands or rings D, encircling the cylinder, thus permitting the cylinder to be freely rotated, but the engagement or entrance of the pulleys or rollers in the grooves $a$ of the bands preventing any appreciable end-play of the cylinder. The cylinder is furnished in its side or end, but preferably in the side, with a door or cover, E, which may be opened or removed to give access to its interior, to permit the supply of material to be inserted or removed.

F indicates a shaft passing centrally and longitudinally through the cylinder and supported in boxes or bearings G, which may be formed in or secured to the cylinder-heads or located in or upon the frame A; or both plans may be combined. This shaft, which may be furnished with a band-pulley or gear-wheel, or with a hand-crank, or both, as shown in Fig. 1, and indicated by the letters $b$ and $c$, is furnished with spokes or arms $d$ within the cylinder, which spokes serve to carry and support the rubbers or presser-bars H. These bars or rubbers form a very important feature of my machine, since upon their form depends in great measure the success or failure of the machine.

Figure 3:
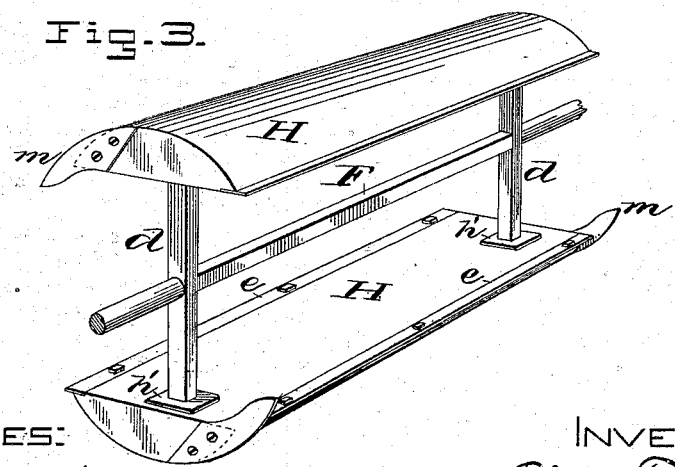

By referring to Figs. 2 and 3 it will be seen that the bars or rubbers H are rounded on their outer faces, and that each is formed with a thin outwardly-projecting lip or flange, $e$, which I term a "gage" or "divider," since it serves to separate the mass of material in the cylinder into two parts, one part passing between the gage-lip and the cylinder-wall and the remainder falling on the inner face of the pressing or rubbing bars H.

In operation the cylinder is ordinarily made to rotate in one direction and the shaft and rubbers to rotate in the opposite direction; and in order that the rotation of the shaft and the movement of the rubbers may take place freely and without clogging, it is necessary that the material, after passing between the cylinder-wall and gage-lip $e$, shall be freed from pressure for an instant, and then gradually brought into a narrower space, so as to produce a progressive pressing action, instead of bringing it immediately under the pressing-surface. I therefore undercut the said lip or gage e, as shown in Figs. 2 and 3—that is to say, I form the lip at an angle to the outer face of the rubber or bar H—and, as a consequence, the throat or passage f between the rubber or bar and the surface of the cylinder is quite narrow or contracted at the forward end, or at the point where the material enters said space, thus gaging or determining exactly the quantity of material which may enter said passage or throat, which material is thereupon immediately freed from pressure by entering the enlarged or widened space under or in rear of the lip or gage, and is then gradually and progressively brought into the narrower and more contracted portion of the throat or passage, where it is thoroughly and effectively pressed and rubbed.

The precise form of the lip and of the passage or throat f is not essential; but it is desirable that the lip should not be very thick, and important that the throat be wider under or in rear of the lip than between the lip and inner wall of the drum or cylinder.

The rubbers or bars H are preferably formed with sockets h, to receive the ends of the spokes, and springs g are interposed between the ends of the spokes and the rubbers to give a desirable degree of elasticity to the latter in their action; but it is obvious that the spokes or arms d may be bored out or made hollow to receive stems projecting from the inner faces of the rubbers or bars H, and in either case a close-fitting washer or bushing, h', of rubber, leather, metal, or other suitable material, will be applied to the spoke or rubber, to prevent the materials acted upon from entering the sockets g.

In order to give the proper relative motions to the drum or cylinder and its rubber or presser-bar shaft, the latter is furnished with a gear-wheel or pinion, i, which meshes with a second gear or pinion, j, carried by an arm, k, journaled on the shaft F, and which second gear or pinion meshes with an internally-toothed ring, l, made fast upon the head of the drum or cylinder, as represented. It is, however, apparent that the second pinion or gear may be mounted upon a journal carried by the frame A, and it is likewise obvious that the arrangement of gearing may be considerably modified, such gearing being common and well known in flour-dressing machinery. The arm k may be secured to frame A.

It will also be seen that the drum or cylinder may, if preferred, be carried by journals instead of by the anti-friction rollers, and that, if desired, feed-inlets and discharge-openings may be made by which the material may be received and discharged without stopping the motion of the drum or shaft. I however prefer the construction and arrangement illustrated and explained.

The benefits and advantages due to the peculiar construction of the rubber may be to some extent secured in machines in which either the drum or the rubber remains stationary while the other rotates, or in which a reciprocating or semi-rotary motion is substituted for a rotary movement.

I would also add that, instead of being rounded, the rubbing-face may be beveled or inclined; but such construction is not desirable.

The materials or ingredients being introduced into the drum and the latter tightly closed, the drum and rubbers are put in motion and caused to travel in reverse directions. The rotation of the drum carries the matters upward and permits them to fall, thus insuring a thorough mixing, which is rendered more perfect by the stirring action of the rubbers or presser-bars passing through the mass. Such of the materials as pass under the gage-lip are pressed by the forward movement of the rubber crowding them into a more contracted space, and in traveling over the material thus compressed the rubber rubs and works the ingredients together, pulverizing or rubbing out any lumps or masses of matter that may have formed.

Such a machine as above described has been quite largely used by me in a commercial way and gives great satisfaction, though prior to the adoption of the undercut or projecting gage-lip great difficulty was experienced in securing the desired action. The gage-lip may be made of metal or other suitable material, and either fixed or adjustable.

Scrapers m are advisably secured to the ends of the rubbers or presser-bars to throw the material away from the cylinder-heads; or the latter may be made concave and the ends of the rubbers suitably fashioned to travel close to the surface or face thereof, for the same purpose.

I am aware that a dough-kneading machine has been patented in which a rotary shaft carried on opposite sides of the center a scraper or stirrer and a spring-pressed roller—one to scrape the material from the semicircular trough or tray and to divide it into smaller particles, the other to press and rub the mass against the surface of the trough—and that an eccentric spring-pressed rubber has been likewise arranged to press the materials against the walls or face of a tub or trough; and these I do not claim.

I am aware that scrapers have been used to follow a rubbing or pressing device and remove adhering material from the walls of a containing-vessel, and this I do not claim. My scrapers are at the ends of a rubber or pressing-bar, and serve to prevent the material from working in between the ends of said rubber or presser, and the heads of the drum or containing-vessel, in order to prevent said material from impeding the forward movement of the rubber or bar.

Having thus described my invention, what I claim is—

1. In a mixing and rubbing machine substantially such as described and shown, the combination of a drum or receptacle and a rubber or bar arranged to act in conjunction therewith, and provided with a projecting gage-lip and a rounded face in rear of said lip, substantially as and for the purpose explained.

2. In combination with cylinder or drum B, one or more traveling bars or rubbers, H, arranged to travel within said cylinder, close to the inner surface thereof, and provided with a gage-lip, $e$, a recessed portion immediately in rear of said lip, and with a rounded face in rear of said recessed portion and lip, whereby a throat or passage, $f$, is formed between the cylinder and rubber, having a contracted entrance, a clearance-space succeeding said entrance, and a gradually-narrowing space following the clearance-space, as shown and described.

3. In a mixing-machine substantially such as shown, the combination of a rotary shaft provided with spokes or arms, a presser-bar or rubber provided with sockets to receive the spokes, springs interposed between the ends of the spokes and the bottoms of the sockets, and washers or bushings encircling the spokes, substantially as shown, to prevent the entrance of matters into the sockets.

4. The herein-described mixing and rubbing machine, consisting of frame A, drum B, mounted and free to rotate in said frame, and provided with gear-ring $l$, shaft F, provided with rubbers H and pinion $i$, and intermediate pinion, $j$, all arranged and operating substantially as shown and explained.

5. In a mixing-machine substantially such as shown and described, a rubber or presser-bar, H, having a rounded outer face, a gage-lip, $e$, and a scraper, $m$, at each end.

PHILIP THORPE.

Witnesses:
  GEO. T. GRAHAM,
  WILLIAM W. DODGE.